March 30, 1954   D. B. GALLIE ET AL   2,673,454
REFRIGERATED WORM CONTAINER
Filed Oct. 14, 1952
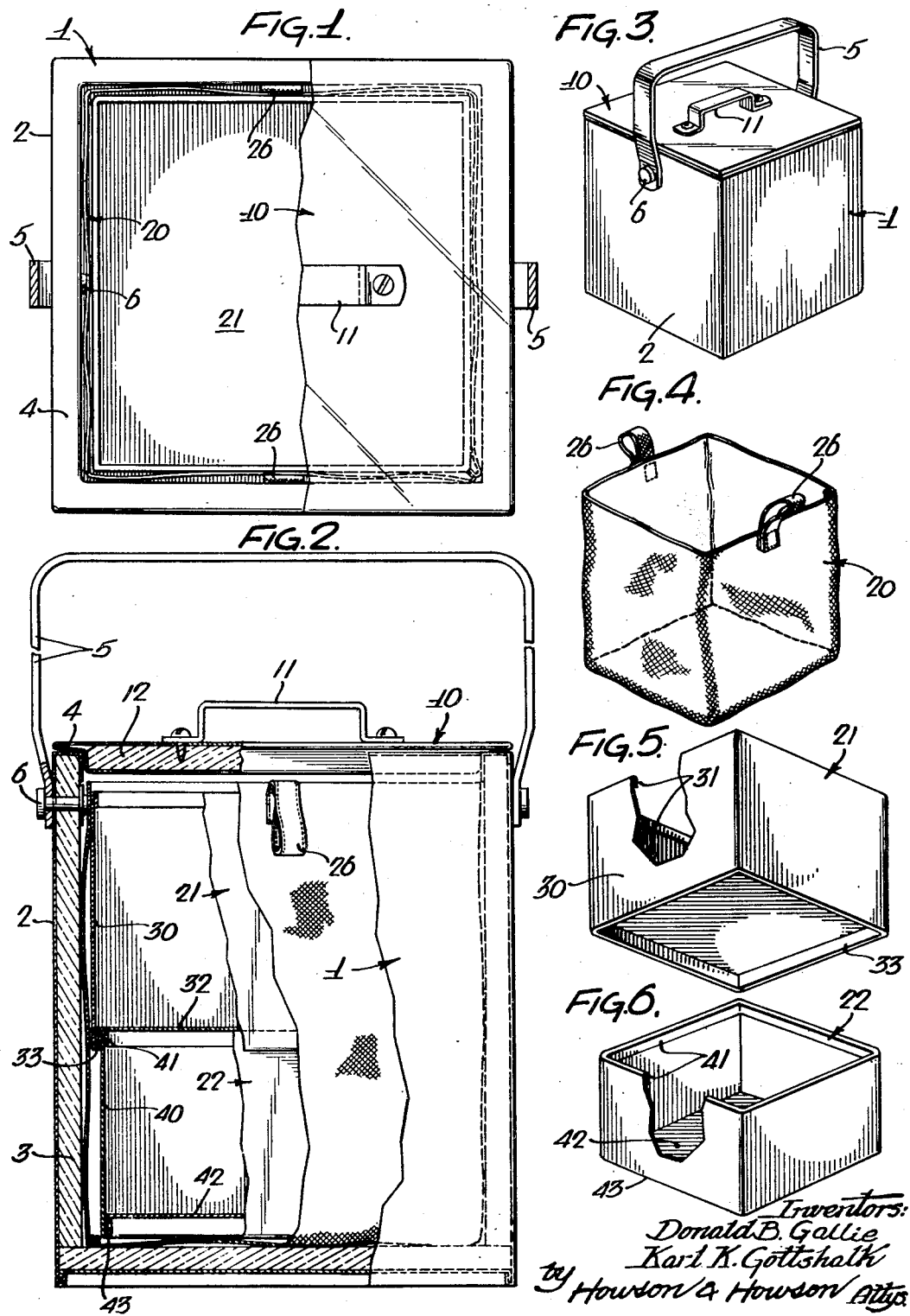
Inventors:
Donald B. Gallie
Karl K. Gottsholk
by Howson & Howson Attys Patented Mar. 30, 1954

2,673,454

UNITED STATES PATENT OFFICE 2,673,454

REFRIGERATED WORM CONTAINER

Donald B. Gallie and Karl K. Gottshalk,
Perkiomenville, Pa.

Application October 14, 1952, Serial No. 314,669

6 Claims. (Cl. 62—86)

The present invention relates to portable refrigerated containers for fish bait and has special application to containers for worms.

The optimum temperature for preserving worms of the class known as "night crawlers" is approximately 60° F. When using worms in substantial quantities, there is frequently difficulty in preserving them over a sufficiently extended period. For example, when fishing from an open boat, the direct rays of the sun may tend to warm the conventional container above the optimum preserving temperature. When kept above this temperature for any substantial period, the worms become sluggish and limp and lose much or all of their bait value. Furthermore, at elevated temperatures the worms are subject to a high mortality rate and, because of their tendency to rapid putrefaction, a single death may result in loss of the entire supply.

A principal object of the invention, therefore, is to provide a compact, portable refrigerated container for worms or the like wherein the bait will be maintained at or near the optimum preserving temperature under widely varying external conditions.

Another object is to provide a highly efficient refrigerated container of the above-stated type wherein heat loss to the surrounding air is minimized both when the container is closed and when opened to afford access to the contents.

A further object is to provide a bait container susceptible of economic manufacture and comprising separate bait and refrigerant receptacles which are readily removable for cleaning and filling.

In the drawings:

Fig. 1 is a plan view of a worm container made in accordance with the present invention with portions of the lid and bail broken away to more clearly illustrate the construction;

Fig. 2 is a side elevational and partial sectional view of the container;

Fig. 3 is a perspective view of the closed carrier; and,

Figs. 4, 5, and 6 are perspective views of the respective interior elements of the carrier.

In general, the illustrated worm container comprises an outer insulated casing which receives an ice receptacle and a bait receptacle, each made preferably of a highly conductive material such as aluminum or copper. Preferably the bait receptacle fits tightly as a cover on the top of the ice receptacle so that the former may receive substantially its entire refrigeration through the highly conductive walls of the two receptacles. The receptacles may be contained in a removable fabric bag or liner which fits more or less loosely within the interior of the insulated casing and the casing itself is formed with a top opening to permit insertion and removal of the receptacles and the liner. The opening is sufficiently wide to afford ready access to the upper bait receptacle, and is loosely fitted with an insulated lid.

In using the device the lower receptacle is filled with ice, the receptacle preferably having a capacity for one or two trays of ice cubes from the conventional mechanical refrigerator. The bait receptacle is fitted to the refrigerant receptacle, and the nested receptacles are placed in the casing. The bait worms are placed in the upper bait receptacle and crumpled or shredded newspaper or spahgnum moss is loosely inserted on top. If the worms are night crawlers, newspaper has been found preferable since it not only serves to insulate the worms from the warmer outside air and to protect them from the direct rays of the sun, but also serves them as food. If the worms are blood worms, the moss is preferable for the same reasons. Other loose insulation materials may be substituted for the paper or moss. As stated above, an insulated lid is provided for the container, but the lid may be safely removed while fishing, allowing the loose paper or moss to serve as an insulation barrier.

The details of the preferred construction are clearly illustrated in the accompanying drawings. The outer casing 1 comprises a thin shell 2 preferably formed of aluminum, copper, or other light, durable material, and is lined with a suitable insulation material 3. The insulation preferably is self-sustaining and waterproof to avoid possible deterioration from wetting. In the present instance the insulation is in sheet form and is held in place by flanges 4 bent inwardly and downwardly at the upper peripheral edge of the shell.

A suitable bail 5 is pivoted to the outer casing 1 as by rivets 6, 6. The bail is dimensioned so as to lie to one side of the outer casing when in the horizontal position and to thereby leave the top opening unobstructed for ready removal of the lid and access to the worms. The lid, indicated by the reference numeral 10, is loosely fitted into the top of the casing and is provided with a handle 11. The lid is insulated by suitable insulation material 12, corresponding to the lining insulation 3.

The removable interior elements of the carrier comprise an upper bait receptacle 21 and a lower refrigerant receptacle 22, the former receptacle being adapted to fit snugly as a cover on the top of the latter. In the present instance a fabric liner 20 is provided in the form of a bag within which the two receptacles, when nested, fit and which, in turn, fits loosely in the interior of the casing 1. The liner 20 may be of any suitable textile fabric or other sheet material and may be either water absorbent or water resistant as found desirable. If water absorbent, it may be dampened to serve as a further means for cooling the upper and lower compartments within the receptacles 21 and 22 respectively; and if water resistant, it may serve to additionally insulate the compartments from the casing. It is to be noted that the liner 20 is provided with suitable handles 26 which may be folded within the liner when the latter is in place within the casing, these handles being useful for lifting the liner and the contained receptacles for insertion in or withdrawal from the interior of the casing.

The upper receptacle consists of a box-like structure formed preferably of a heat-conductive material such as aluminum or copper. The upper edges of the side walls 30 are beaded over as indicated at 31, and the lower edges of the walls are turned up to receive a downturned lip on the bottom wall 32 (see Fig. 2). The lip is sealed within the upturned lower edge portion of the side walls 30, providing a downwardly depending flange 33 around the lower peripheral edge of the walls. The flange 33 is adapted to snugly embrace the upper edge of the receptacle 22, as more fully set forth below, to provide a close heat-conductive joint between the two receptacles.

The lower receptacle 22 is similarly constructed but is of reduced transverse dimensions, so as to permit its upper beaded edge 41 to fit snugly within the aforedescribed downwardly depending flange 33 of the upper receptacle. The bottom 42 of the lower receptacle has a downturned lip which is sealed in the upturned lower edge portion of the side walls 40 so as to provide a lower peripheral flange 43 similar to the flange 33. The flange 43 suitably spaces the bottom 42 of the lower receptacle from the bottom wall of the outer container to provide an air space therebetween, further limiting heat loss from the refrigerant compartment. An air space is provided around the side walls 40 by reason of the reduced dimensions of the receptacle 22, and the depending flange 33 of the upper receptacle serves to center the lower receptacle in the casing so as to insure the presence of the air space at all sides of the latter receptacle. With this arrangement and because of the tight fit between the flange 33 and the bead 41, the greatest part of the cooling of the receptacle 21 is by heat conduction through the walls of the receptacles. This type of cooling affords a desirable control of the refrigeration and the temperature is maintained relatively constant with minimum loss to the surrounding air even when the lid 10 is removed from the container.

Both of the receptacles 21 and 22 are of simple box-like construction, so that the cost of the production is low. To reduce heat absorption by the carrier, the outer shell may be formed with a metal such as aluminum which has a polished surface for reflecting the extraneous heat rays. Also, by making the casing and the receptacles of aluminum, the weight of the carrier may be minimized without detracting from the desirable characteristics outlined above.

We claim:

1. A refrigerated container for worms and the like comprising an outer casing, a layer of insulating material disposed adjacent said outer casing, two receptacles each formed of heat-conductive material and adapted to be received one above the other within said casing in spaced relation to said layer of insulating material, the said first receptacle providing a compartment for the worms and the second said receptacle providing a separate compartment for a refrigerant, said first receptacle being formed to fit as a cover on said second receptacle, and to afford a joint for efficient thermal transfer from one receptacle to the other, and a readily removable insulated closure for the casing.

2. A container according to claim 1 wherein said first receptacle is open at the top and terminates below the top of the casing, and is adapted to receive loose insulation material constituting a cover for the worms and an insulating barrier between the walls of the said compartment and the air exterior of the casing when the closure has been removed.

3. A container according to claim 1 wherein said first receptacle is provided along the lower peripheral edge of its side walls with a downwardly-depending flange adapted to snugly and telescopically receive the upper edge portion of the second receptacle for thermal transfer between said first and second receptacles, to effectively close said second receptacle at the top, and to center the second receptacle in the casing in spaced relation to the walls of the latter.

4. A container according to claim 1 wherein a flexible liner is interposed between the interior walls of said casing and said receptacle, said liner being in the form of an open topped bag and being provided with handle portions and constituting means for insertion and removal of said receptacles in and from the casing.

5. A container according to claim 1 wherein the first receptacle is somewhat larger in transverse dimension than the second, and wherein further the latter receptacle fits telescopically within a recess in the bottom of the first receptacle so that the latter acts to maintain the second receptacle in spaced relation with the side walls of the casing.

6. A container according to claim 5 including means for maintaining the major area of the bottom surface of the second receptacle in spaced relation to the bottom wall of the casing.

DONALD B. GALLIE.
KARL K. GOTTSHALK.

References Cited in the file of this patent

UNITED STATES PATENTS

| Number | Name | Date |
| --- | --- | --- |
| 851,097 | Kruse | Apr. 23, 1907 |
| 1,324,653 | Ferdon | Dec. 9, 1919 |
| 1,577,823 | Dolle | Mar. 23, 1926 |
| 1,650,520 | Johnson | Nov. 22, 1927 |
| 2,216,202 | Lake | Oct. 1, 1940 |
| 2,570,300 | Acton | Oct. 9, 1951 |
| 2,610,756 | Best | Sept. 16, 1952 |